US012791813B2

(12) United States Patent
Compton et al.

(10) Patent No.: US 12,791,813 B2
(45) Date of Patent: Nov. 10, 2026

(54) FIBER OPTIC CABLE ASSEMBLIES AND SYSTEMS USING SAME

(71) Applicant: CORNING RESEARCH & DEVELOPMENT CORPORATION, Corning, NY (US)

(72) Inventors: Brandon Duvall Compton, Newton, NC (US); Terry Lee Cooke, Hickory, NC (US); Brandon O'Brien Norwood, Lincolnton, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 260 days.

(21) Appl. No.: 18/601,134

(22) Filed: Mar. 11, 2024

(65) Prior Publication Data

US 2024/0310596 A1 Sep. 19, 2024

Related U.S. Application Data

(60) Provisional application No. 63/451,685, filed on Mar. 13, 2023.

(51) Int. Cl.
*G02B 6/44* (2006.01)

(52) U.S. Cl.
CPC ....... *G02B 6/44524* (2023.05); *G02B 6/4475* (2013.01); *G02B 6/4422* (2013.01); *G02B 6/44528* (2023.05)

(58) Field of Classification Search
None
See application file for complete search history.

(56) References Cited

U.S. PATENT DOCUMENTS

| | | | | |
|---|---|---|---|---|
| 6,866,541 | B2 | 3/2005 | Barker et al. | |
| 10,547,166 | B2 | 1/2020 | Wang et al. | |
| 2008/0017760 | A1 | 1/2008 | Larsen et al. | |
| 2008/0080826 | A1 | 4/2008 | Leon et al. | |
| 2008/0170833 | A1* | 7/2008 | Castonguay ........... | G02B 6/445 385/135 |

(Continued)

FOREIGN PATENT DOCUMENTS

| | | | |
|---|---|---|---|
| EP | 2672592 | A1 | 12/2012 |
| EP | 3317707 | B1 | 5/2020 |

(Continued)

OTHER PUBLICATIONS

Extended European Search Report, EP application No. 24162660.5, dated Jul. 11, 2024, 9 pages, European patent office.

*Primary Examiner* — Jerry Rahll
(74) *Attorney, Agent, or Firm* — Adam R. Weeks

(57) ABSTRACT

A fiber optic cable assembly includes a fiber optic cable having a plurality of subunit cables, where at least one of the plurality of subunit cables includes at least one optical fiber, and at least one terminal along a length of the fiber optic cable. The at least one terminal includes a housing having a plurality of wall portions, where the plurality of wall portions defines an inlet portion and a main body portion. The inlet portion includes an inlet through which the fiber optic cable enters the housing, and the main body portion includes a plurality of connection ports. At least one of the plurality of connection ports is optically coupled to at least one optical fiber.

23 Claims, 16 Drawing Sheets

(56) References Cited

U.S. PATENT DOCUMENTS

| | | | | |
|---|---|---|---|---|
| 2009/0202214 | A1* | 8/2009 | Holmberg .......... | G02B 6/44528 385/136 |
| 2013/0330043 | A1 | 12/2013 | Goldsmith et al. | |
| 2017/0235073 | A1 | 8/2017 | Ott et al. | |
| 2021/0373271 | A1* | 12/2021 | Geens .................. | G02B 6/4472 |
| 2022/0404574 | A1 | 12/2022 | Cooke et al. | |
| 2024/0111111 | A1 | 4/2024 | Cooke et al. | |

FOREIGN PATENT DOCUMENTS

| | | | | |
|---|---|---|---|---|
| WO | 2017/001893 | A1 | 1/2017 | |
| WO | 2020/214762 | A1 | 10/2020 | |
| WO | WO-2021247709 | A1 * | 12/2021 | ........... G02B 6/4457 |

* cited by examiner

FIBER OPTIC CABLE ASSEMBLIES AND SYSTEMS USING SAME

PRIORITY APPLICATION

This application claims the benefit of priority of U.S. Provisional Application No. 63/451,685, filed on Mar. 13, 2023, the content of which is relied upon and incorporated herein by reference in its entirety.

TECHNICAL FIELD

This disclosure relates generally to fiber optic cables, and more particularly to a pre-engineered fiber optic cable assembly for pre-installation at a location above an equipment rack at a data center. The disclosure also relates to systems including the fiber optic cable assembly to provide a plug-and-play capability.

BACKGROUND

The large amount of data and other information transmitted over the internet has led businesses and other organizations to develop large scale data centers for organizing, processing, storing and/or disseminating large amounts of data. Data centers contain a wide range of network equipment including, for example, servers, networking switches, routers, storage subsystems, etc. Data centers further include a large amount of cabling and equipment racks to organize and interconnect the network equipment in the data center. Modern data centers may include multi-building campuses having, for example, one primary or main building and a number of auxiliary buildings in close proximity to the main building. All the buildings on the campus are interconnected by a local fiber optic network.

Data center design and cabling-infrastructure architecture are increasingly large and complex. To manage the interconnectivity of a data center, the network equipment within the buildings on the data center campus is often arranged in structured data halls having many spaced-apart rows. Each of the rows is, in turn, configured to receive several equipment racks or cabinets (e.g., twenty racks or cabinets) which hold the network equipment. In some data center architectures, each of the rows includes a main patch panel (sometimes part of cabinets or equipment referred to as an intermediate distribution frame) at a front or head end of the row. Distribution cables with a relatively large number of optical fibers (high fiber counts) are routed from a building distribution frame (sometimes referred to as a main distribution frame) to the main patch panels for the different rows of equipment racks.

At the main patch panels, a large number of distribution fiber optic cables with lower fiber counts are connected to the optical fibers of the associated high fiber count distribution cable(s) and routed along the row to connect to the network equipment held in the various racks in the row. To organize the large number of in-row distribution fiber optic cables, each row typically includes a cable tray or basket disposed above the row for supporting the distribution fiber optic cables as they extend along the row. The network equipment in the racks is optically connected to the distribution fiber optic cables by technicians during the construction of the data center using a large number of jumper cables.

While current data center design and cabling-infrastructure architecture are satisfactory for the current needs of the industry, the labor, installation time, and costs to achieve the interconnectivity of the data center can be high. For these reasons, manufacturers continually strive to improve the interconnectivity in the data center. One approach to improve optical infrastructure installation efficiency is to pre-engineer certain infrastructure components. For example, various pre-engineered cables for row interconnectivity at data centers are disclosed in PCT Patent Publication No. WO2020214762A1 ("the '762 publication"), the disclosure of which is incorporated herein by reference in its entirety. According to this disclosure, an installer unpacks the pre-connectorized fiber optic distribution cable, pulls or routes the cable along the cable tray above the row, snaps in connectors at the row main patch panel (e.g., at the head end of the row), and then at each of the racks in the row, installs jumpers between connectors of the distribution cable and the respective network equipment in the racks. The use of a pre-engineered row distribution cable saves a significant amount of time, effort, and costs compared to on-site connectorization and assembly of cables.

While pre-engineered cables, like those in the '762 publication, may assist with reducing labor, installation time and costs, the demand for even faster, lower cost installation remains. For example, there is a desire for the equipment racks used in a data center to have plug-and-play capability. A rack may be delivered to a data center with the network equipment and associated fiber optic cabling pre-installed. The rack is positioned in its designed location within a row of a data hall of the data center and connected to a row distribution cable in the overhead cable tray. The rack is also connected to a power source to provide interconnectivity and functionality. It is believed that by providing equipment racks with plug-and-play features, labor, installation time, and costs for data center construction will be further decreased.

While factory assembly of the fiber optic component assemblies is largely successful, further addressing challenges to efficient handling, routing, and/or connection is desirable.

SUMMARY

In one aspect of the disclosure, a fiber optic cable assembly includes a fiber optic cable having a plurality of subunit cables, where at least one of the plurality of subunit cables includes at least one optical fiber, and at least one terminal along a length of the fiber optic cable. The at least one terminal includes a housing having a plurality of wall portions, where the plurality of wall portions defines an inlet portion and a main body portion. The inlet portion includes an inlet through which the fiber optic cable enters the housing, and the main body portion includes a plurality of connection ports. At least one of the plurality of connection ports is optically coupled to at least one optical fiber of the fiber optic cable.

In one embodiment, the inlet portion encloses a volume and the main body portion encloses a volume greater than the volume of the inlet portion. In one embodiment, the housing includes a neck portion between the inlet portion and the main body portion and the neck portion defines a gap between the inlet portion and the main body portion. In one embodiment, the housing may be asymmetric. For example, in one embodiment, the neck portion may be offset from a centerline of the main body portion of the housing.

In one embodiment, the inlet defines an axis, each of the plurality of connection ports defines an axis, and the axis of the inlet is perpendicular to at least one axis of one of the plurality of the connection ports. For example, the axis of the inlet and the at least one axis of one of the plurality of the connection ports may be in the same plane. Alternatively, the axis of the inlet and the at least one axis of one of the plurality of the connection ports may be in different planes. In one embodiment, the inlet includes an axis, each of the plurality of connection ports includes an axis, and the axis of the inlet is parallel to at least one axis of one of the plurality of the connection ports. In one embodiment, the axis of the inlet and the at least one axis of one of the plurality of the connection ports may be in different planes.

In one embodiment, the main body portion may include a storage space and a portion of the at least one subunit cable may be coiled in the storage space adjacent the connection ports. In one embodiment, the least one terminal may form a terminal end of the fiber optic cable assembly. In one embodiment, the at least one terminal may include a first terminal and a second terminal and at least one subunit of the fiber optic cable passes through the first terminal and enters the second terminal. In one embodiment, the at least one terminal may include a hanger system for coupling the terminal to a cable tray. In one embodiment, the hanger system may include a bracket configured to couple the housing to a bottom wall of the cable tray.

In one embodiment, the plurality of connection ports may be arranged in an array, where the array may define a plane that divides the housing, and where the plane of the array is parallel to a plane of the bottom wall when the terminal is coupled to the cable tray. In one embodiment, the hanger system may be configured to be secured to the cable tray with the plurality of connection ports being positioned at an elevation of the cable tray.

In another aspect of the disclosure, a system of a cable tray and the fiber optic cable assembly is disclosed. The cable tray includes a sidewall and a bottom wall, where the sidewall includes an opening. The housing includes a neck portion between the inlet portion and the main body portion and the neck portion defines a gap between the inlet portion and the main body portion. The sidewall of the cable tray is received in the gap.

In a further aspect of the disclosure, a set of fiber optic cable assemblies according to the first aspect is disclosed. The set of fiber optic cable assemblies includes a first fiber optic cable assembly including a first fiber optic cable having a first length from a first one or more connectors to a first terminal, and a second fiber optic cable assembly including a second fiber optic cable having a second length from a second one or more connectors to a second terminal. The first length is different from the second length. In one embodiment, the first terminal may form a terminal end of the first fiber optic cable assembly, and the second terminal may form a terminal end of the second fiber optic cable assembly.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Figure 1:
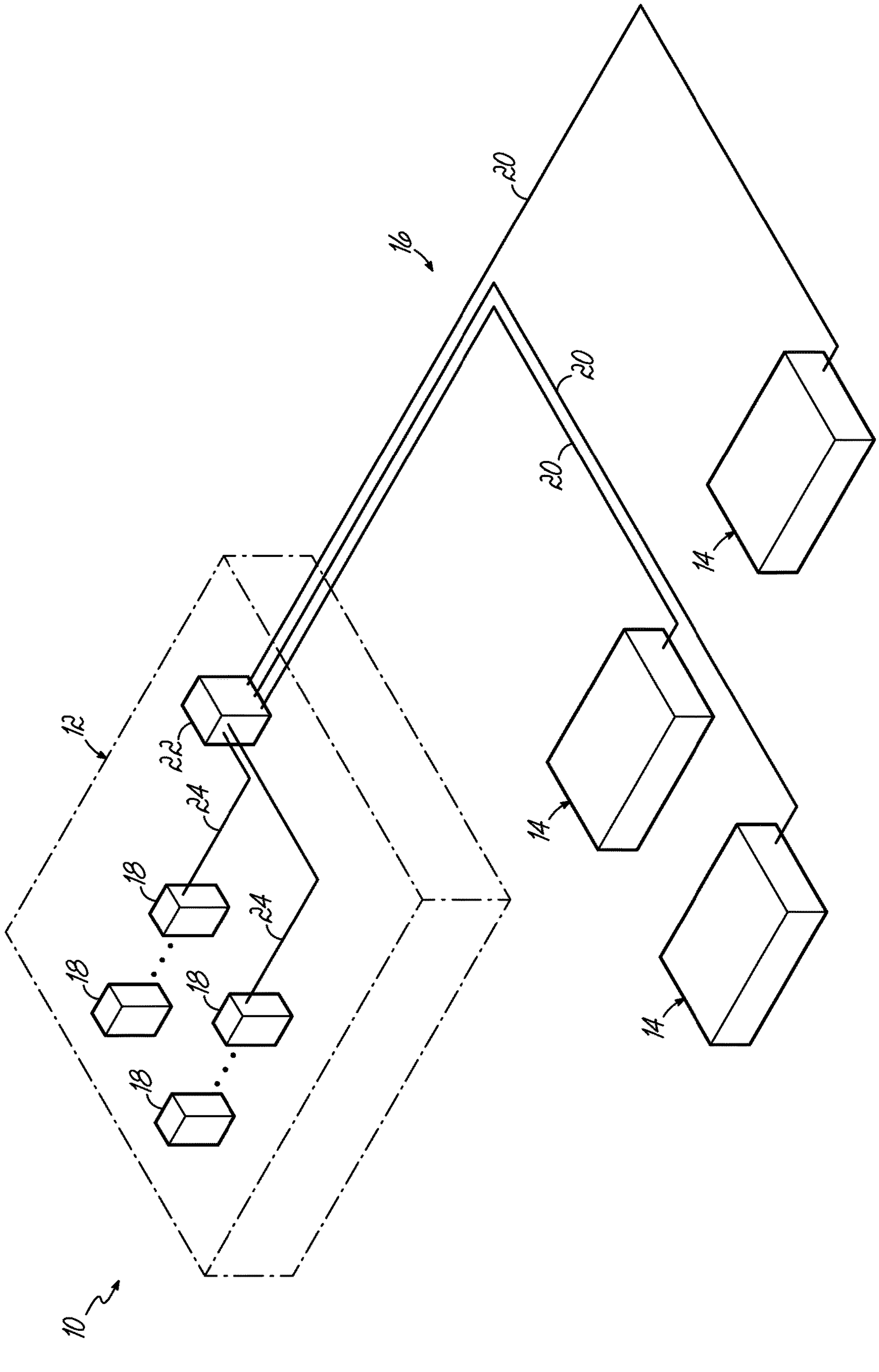
FIG. 1 is a schematic view of a data center in accordance with one aspect of the disclosure.

Various embodiments will be further clarified by examples in the description below. In general, the description relates to fiber optic cable assemblies having one or more terminals received on a fiber optic cable. The terminals include a plurality of connection ports in an array along at least one side. The assemblies are factory-constructed and find use in data centers and the like in which a high density of optical fibers is desirable. Exemplary fiber optic cable assemblies permit connectivity above an equipment rack at the one or more terminals. The terminals are external to the rack at an elevated location, e.g., at a height of a cable tray. Individual ones of the connection ports in the array receive optical fiber connectors that may provide optical connectivity via a rack cable assembly with equipment in the rack. With the terminal above the rack, the rack may no longer require a patch panel in the rack. Advantageously, fiber optic cable assemblies consistent with the disclosure may replace the necessity of the patch panel in the rack thereby creating more space, for example, for network equipment in the rack.

Embodiments of the invention provide other space-saving advantages. For example, the terminals are configured for attachment to the overhead cable tray. However, only a small portion of the terminal extends into the overhead cable tray. From a different perspective, the majority of the terminal is positioned externally of the cable tray, including the array of connection ports. Consumption of the space in the tray is thereby minimized. As an example, the terminal extends through an opening in a sidewall of the cable tray so that a portion of the terminal is inside and a portion of the terminal is outside of the cable tray. A footprint of the terminal in the cable tray may be determined only by dimensions of the portion of the terminal in the tray. That is, the terminal extends into the cable tray by a distance sufficient to properly route the fiber optic cable in the cable tray. The footprint of the terminal in the cable tray thus approximates (i.e., slightly larger) the dimensions of the fiber optic cable. Embodiments of the fiber optic cable assembly therefore conserve space in the cable tray. This space saving configuration eases pulling of additional cables in or through the cable tray during installation while also permitting more cables to properly fit in the cable tray.

Advantageously, cable assemblies may be fully assembled at a factory and shipped to an installation site with one or more terminals at predetermined locations on the fiber optic cable. At the installation site, and following routing of the fiber optic cable, technicians may secure each terminal to the cable tray. Multiple additional fiber optic cable assemblies may then be pulled into the cable tray. No field assembly of the fiber optic cable assembly is required in the field. The fiber optic cable assemblies according to disclosed embodiments eliminate significant labor at the installation site and so reduce overall costs of installation at the data center. These and other features of fiber optic cable assemblies according to embodiments of the disclosure are discussed in more detail below.

As illustrated in FIG. 1, a data center 10 may include a collection of buildings (referred to as a data center campus) having, for example, a main building 12 and one or more auxiliary buildings 14 in proximity to the main building 12. While three auxiliary buildings are shown, there may be more or fewer depending on the size of the campus. The data center 10 provides for a local fiber optic network 16 that interconnects the auxiliary buildings 14 with the main building 12. The local fiber optic network 16 allows network equipment 18 in the main building 12 to communicate with various network equipment (not shown) in the auxiliary buildings 14. In the exemplary embodiment shown, the local fiber optic network 16 includes trunk cables 20 extending between the main building 12 and each of the auxiliary buildings 14. Trunk cables 20 include a high fiber-count arrangement of optical fibers for passing data and other information through the local fiber optic network 16. In the example illustrated in FIG. 1, the trunk cables 20 from the auxiliary buildings 14 are routed to one or more distribution cabinets 22 (one shown) housed in the main building 12.

Within the main building 12, indoor fiber optic cables 24 are routed between the network equipment 18 and the distribution cabinet 22. The indoor fiber optic cables 24 generally include a high fiber-count arrangement of optical fibers for passing data and other information from the distribution cabinet 22 to the network equipment 18. Although only the interior of the main building 12 is schematically shown in FIG. 1 and discussed above, each of the auxiliary buildings 14 may house similar equipment for similar purposes. Thus, each of the trunk cables 20 may be routed to a distribution cabinet in one of the auxiliary buildings 14 in a manner similar to that described above. Furthermore, each of the auxiliary buildings 14 may include indoor cables that extend between network equipment and the distribution cabinets of the auxiliary building 14.

Figure 2:
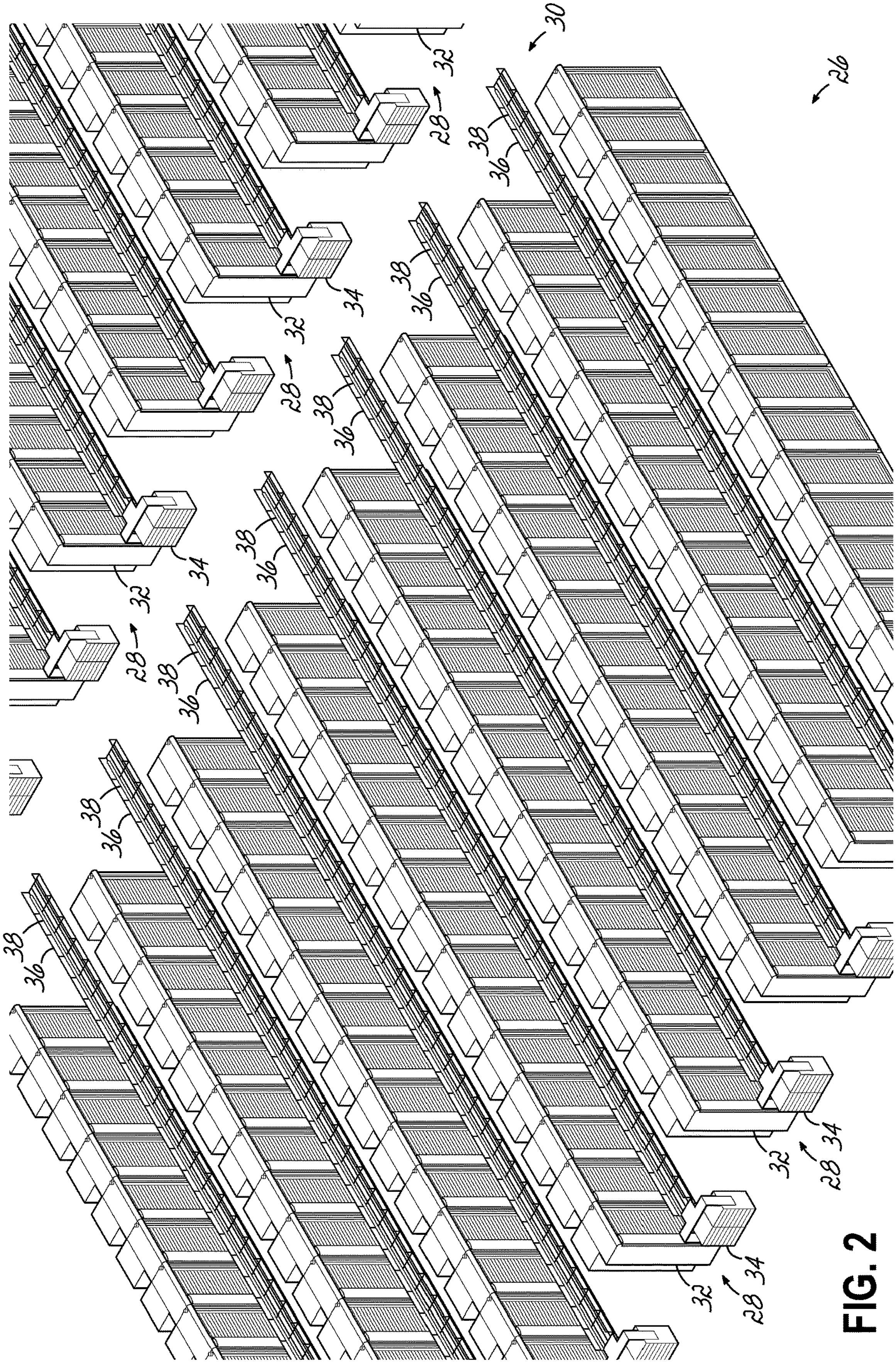
FIG. 2 is a perspective view of an exemplary data hall of the data center shown in FIG. 1 according to one embodiment.
Figure 3:
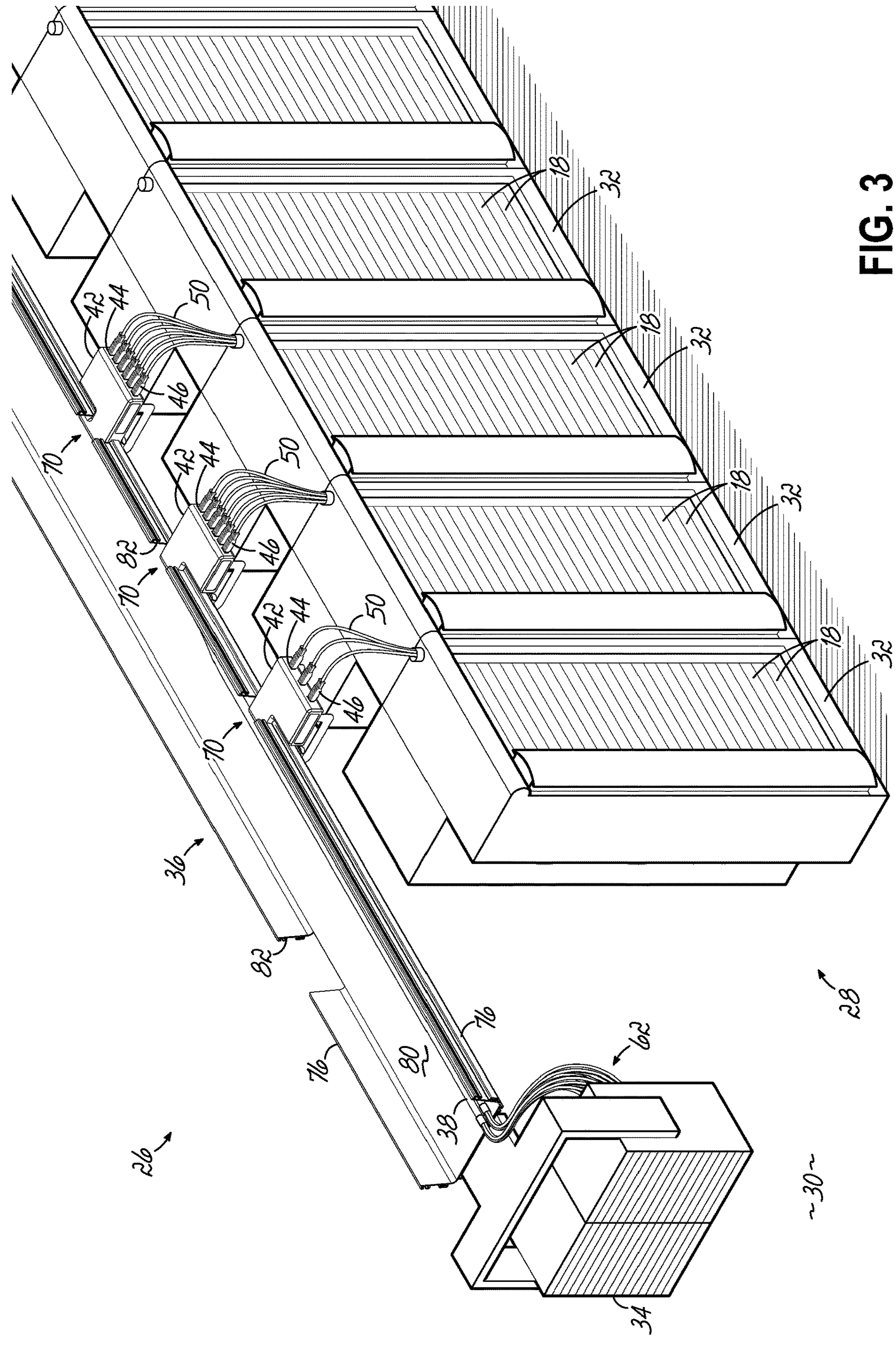
FIG. 3 is a partial perspective view of the data hall of FIG. 2 illustrating fiber optic cable assemblies in an overhead cable tray in accordance with embodiments of the disclosure.

As illustrated in more detail in FIGS. 2 and 3, the network equipment 18 in the main building 12 or an auxiliary building 14 may be arranged in one or more data halls 26 that generally include a plurality of spaced-apart rows 28 on one or both sides of an access pathway 30. The arrangement of the data halls 26 into rows 28 helps organize the large number of equipment, fiber optic cables, fiber optic connections, etc. Each of the rows 28 includes a plurality of racks or cabinets 32 (referred to hereafter as "racks 32") generally arranged one next to the other along the row 28. Each of the racks 32 are vertically arranged frames for holding various network equipment 18 of the data center 10, as is generally known in the fiber optics industry. In one common arrangement, each row 28 may include an end-of-row patch panel 34 at the front or head end of the row 28 closest to the access pathway 30. The patch panel 34 represents a termination point of at least some of the optical fibers carried by one or more of the indoor fiber optic cables 24 (FIG. 2), for example. In other embodiments, the patch panel 34 may be located within the associated row, such as in the middle of the row.

In a conventional arrangement, one or more distribution cables are connected to the patch panel 34 of a row 28 and routed along an overhead cable tray 36 generally disposed above the row 28. The network equipment 18 in the racks 32 is then optically connected to the one or more distribution cables to provide the interconnectivity of the network equipment 18 of the data center 10. Aspects of the present disclosure are directed to a fiber optic cable assembly configured to be connected to the patch panel 34 of a row 28 and routed along the overhead cable tray 36 or other overhead cable support for the row 28. The fiber optic cable assembly is configured to distribute optical connection points from the patch panel 34 to a location proximate one or more of the racks 32. In the examples shown, the assembly provides an optical connection point at or near the overhead cable tray 36, such as above the respective rack 32. A rack cable assembly housed in the racks 32 is then utilized to optically connect the network equipment 18 in the racks 32 at the optical connection point provided by the fiber optic cable assembly in an improved manner as will be described below.

Figure 4:
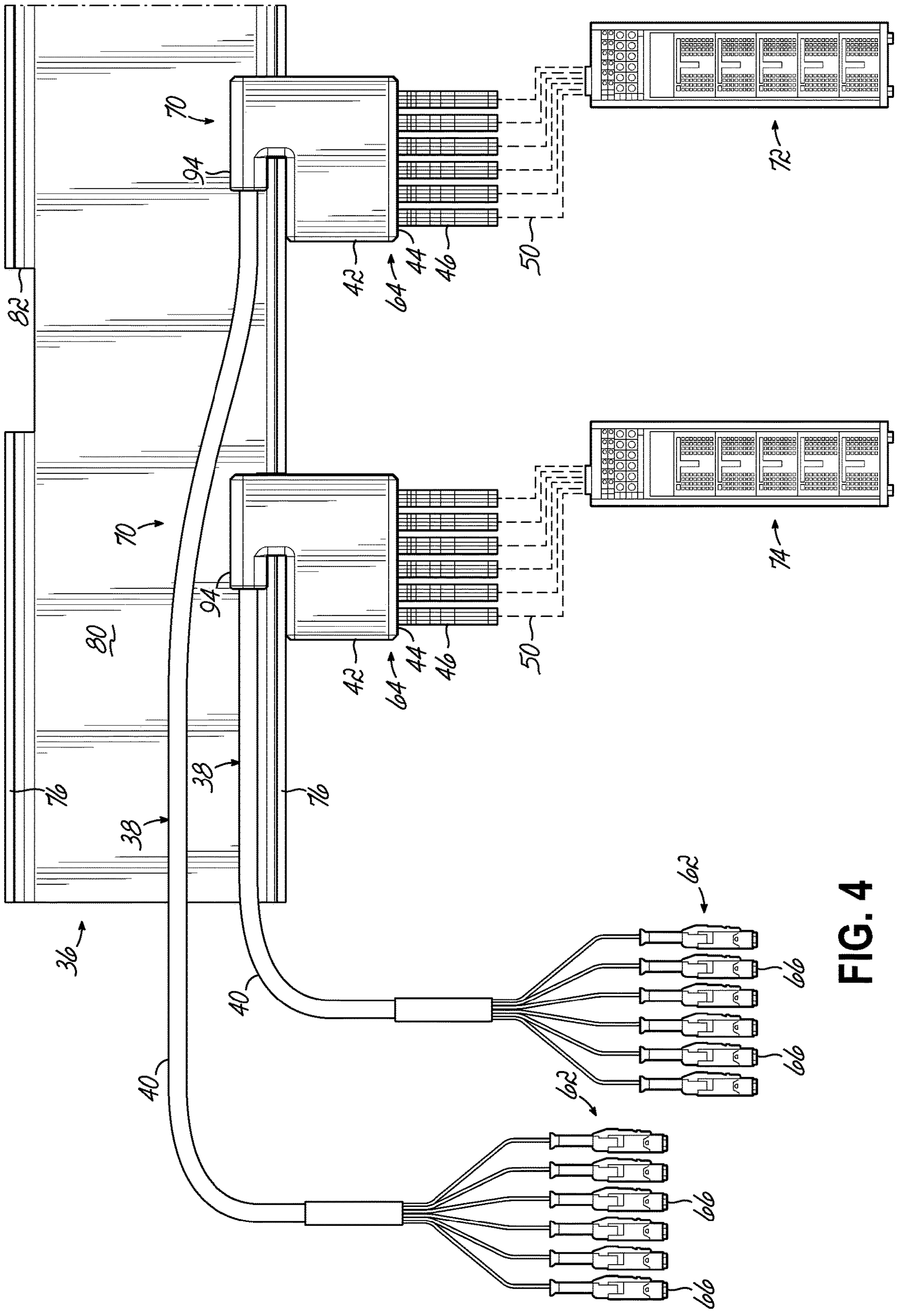
FIG. 4 is a schematic elevation view of an overhead cable tray, fiber optic cable assemblies providing an array of connection ports, and respective racks in accordance with embodiments of the disclosure.

With reference to FIGS. 3 and 4, an exemplary fiber optic cable assembly 38 in accordance with an embodiment of the disclosure is shown. Although the fiber optic cable assembly 38 will be discussed in more detail below in the context of a fiber optic cable assembly connected between the patch panel 34 at the head end of a row 28 and the network equipment 18 in the racks 32 of the row 28, the fiber optic cable assembly 38 is not limited to such an application. Accordingly, it should be understood that the fiber optic cable assembly 38 may be used in other contexts of a data center, or other contexts of a fiber optic network more generally.

In general, and with continued reference to FIGS. 3 and 4, the fiber optic cable assembly 38 includes a fiber optic cable 40 that carries a plurality of optical fibers for passing data and other information through the local fiber optic network 16 (FIG. 1), and more specifically between the end-of-row patch panel 34 and the network equipment 18 in a rack 32 of the row 28. The number of optical fibers carried by the fiber optic cable 40 and how the optical fibers are arranged within the fiber optic cable 40 may vary based on the application.

Figure 5:
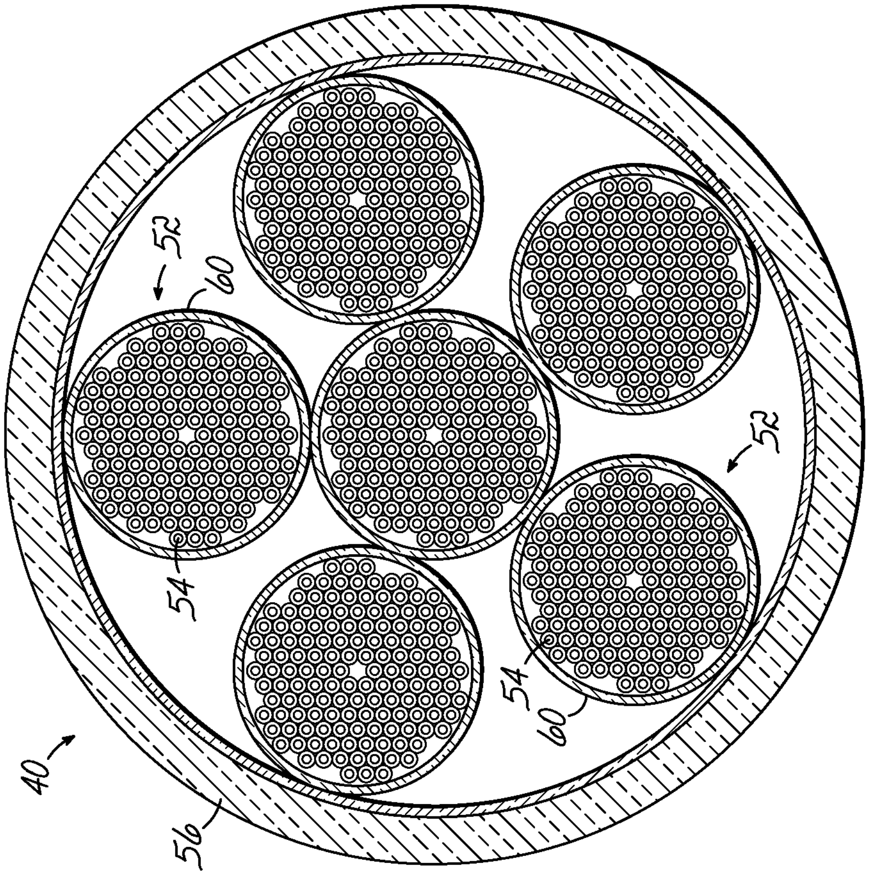
FIG. 5 is a cross-sectional view of a fiber optic cable shown in FIG. 4.

FIG. 5 illustrates one exemplary embodiment of the fiber optic cable 40. The fiber optic cable 40 includes a plurality of subunits 52, and each subunit 52 is configured to carry a pre-selected number of optical fibers 54. Although the fiber optic cable 40 is shown as including six subunits 52, the number of subunits 52 may be more or less than this number in alternative embodiments. The plurality of subunits 52 may be arranged within an outer protective sheath 56 ("outer jacket 56"), as is generally known in the industry. As mentioned above, each of the subunits 52 is configured to carry a pre-selected number of optical fibers 54. By way of example and without limitation, in an exemplary embodiment, each subunit 52 may be configured to carry from 24 to 144 optical fibers 54 within a subunit outer jacket 60. It should be recognized, however, that more or less optical fibers 54 may be carried by each of the subunits 52 in alternative embodiments.

Generally, and with reference to the exemplary embodiment shown in FIG. 3, the fiber optic cable assembly 38 establishes connections at a source location (e.g., a distribution frame or patch panel 34, as shown) at an end of the overhead cable tray 36 with one or more terminals 42 being located on the fiber optic cable 40 at predetermined locations in the overhead cable tray 36. The terminals 42 provide an array of connection ports 44 to receive connectors 46, for example, for establishing connections via a rack cable assembly 50 optically coupled to network equipment in the equipment rack 32. Exemplary rack cable assemblies 50 are disclosed in commonly owned copending U.S. patent application Ser. No. 18/591,519. Thus, the fiber optic cable assembly 38 may be a point-to-multipoint assembly that can avoid the need to separately install individual cables from the source location to each destination location.

Figure 10:
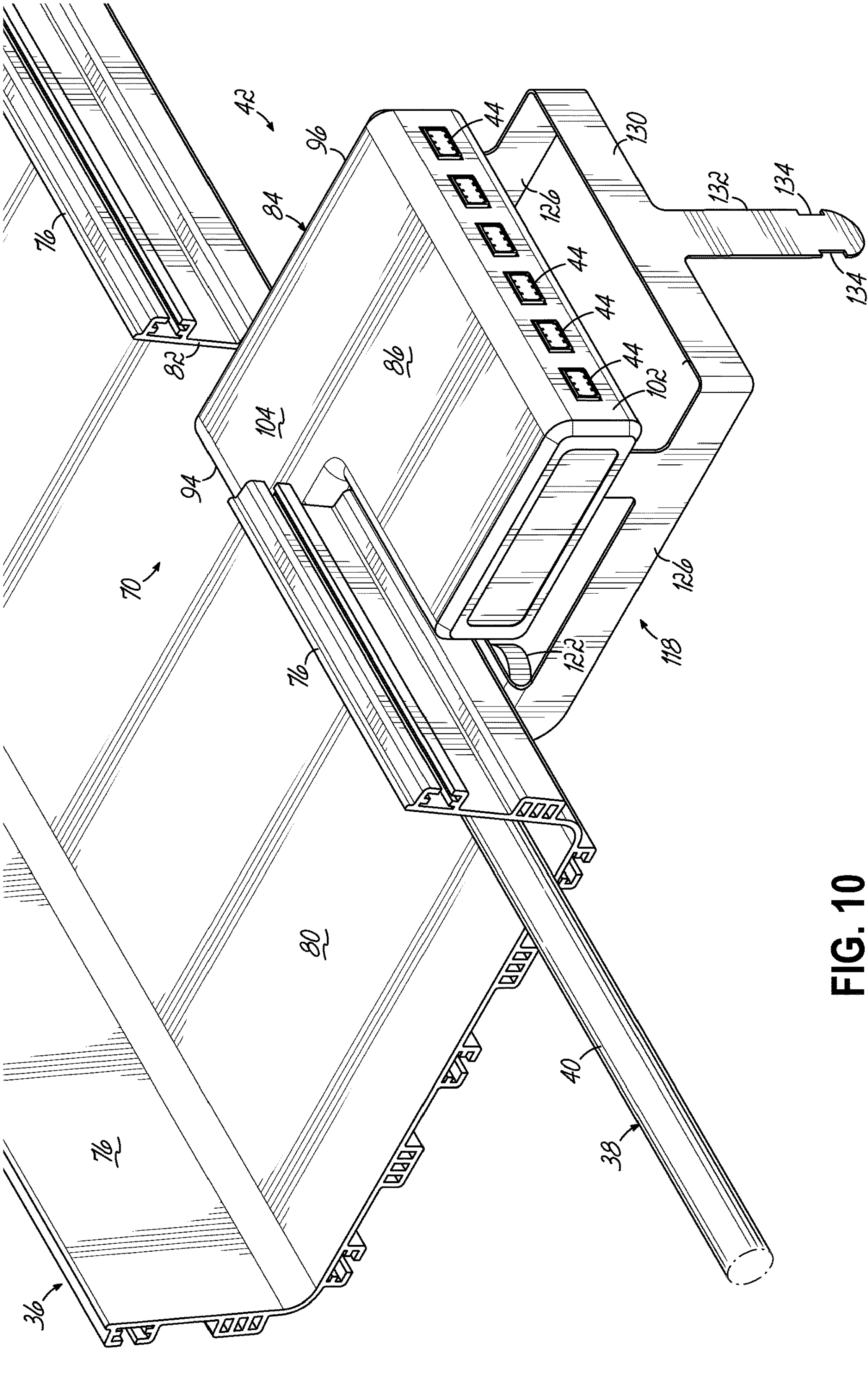
FIG. 10 is a perspective view of a terminal shown coupled to the overhead cable tray in accordance with embodiments of the disclosure.

To those ends, with reference to FIG. 4, two cable assemblies 38 are shown. Each includes the fiber optic cable 40 having a distribution end 62 and a second terminal end 64 opposite the end 62. In the exemplary embodiment, the terminal 42 forms the terminal end 64 of each of the fiber optic cable assemblies 38. In other embodiments, multiple terminals 42 may be disposed along the length of the fiber optic cable 40 between the distribution end 62 and the terminal end 64 with one terminal 42 defining the second end 64. In such embodiments, terminals 42 may serve to pass through predetermined subunits 52 to a cable portion 48 (shown in FIG. 10) via an outlet (not shown) in housing 84. The distribution end 62 of the cable assembly 38 includes a plurality of connectors 66 that terminate one or more of the optical fibers 54 carried by the fiber optic cable 40. The connectors 66 are configured to be connected to optical interfaces or ports associated with the end-of-row patch panel 34. Any conventional, or yet to be developed, optical connector or connectorization scheme may be used in accordance with the present disclosure, including, but not limited to simplex or duplex connectors (e.g., LC connectors) and multi-fiber connectors (e.g., MPO connectors). For example, the distribution connectors 66 may include MPO (multi-fiber push on) connectors, which are configured for multi-fiber cables including multiple sub-units of optical fibers (e.g., between four to 24 optical fibers). In other embodiments, the distribution connectors 66 may be a different type of multi-fiber connector, such as an SN-MT connector commercially available from Senko Advanced Components, Inc. or an MMC connector commercially available from US Conec Ltd. In an exemplary embodiment, the distribution end 62 of the cable assembly 38 may include six connectors 66 with each connector 66 being configured as a 24-fiber MMC connector. As discussed above, the connectors 66 may be pre-connectorized to avoid field assembly of the connectors 66 to the fiber optic cable 40.

In the exemplary embodiments shown in FIGS. 3 and 4, the terminal 42 of each of the cable assemblies 38 is arranged at a distribution point or location 70 in the overhead cable tray 36. The location 70 may be determined by the location of the corresponding rack 32 beneath the overhead cable tray 36. For embodiments of the cable assemblies 38 with a single terminal 42 (as shown in FIG. 4, for example), the location 70 may then establish a predetermined length of the fiber optic cable 40 between the terminal 42 and the distribution end 62. For example, the installation location 70 of the rack 72 (right-most rack in FIG. 4) may be at a further distance from the end-of-row patch panel 34 than the installation location 70 of the rack 74 (left-most rack in FIG. 4). The difference in location of the racks 72, 74 then require different lengths of fiber optic cable 40 between respective the terminal 42 and the distribution end 62 of the cable assemblies 38. In other embodiments in which the cable assemblies 38 have multiple terminals 42 with selected terminals 42 passing through a portion of the fibers, the length of the fiber optic cable 40 to and between the terminals 42 may also be determined by the installation locations 70 relative to the end-of-row patch panel 34. As an example, the locations 70 may generally correspond to the spacing between adjacent racks 32 above which the fiber optic cable assembly 38 is to be installed. This spacing may also determine the dimension of the fiber optic cable 40 to and between terminals 42. In either configuration, for example, and as is generally shown in FIG. 3, when the fiber optic cable assembly 38 is installed in the overhead cable tray 36, the terminals 42 are generally disposed a short distance above the respective rack 32 to which the terminal 42 is to be connected. In one embodiment, the installation locations 70 may be uniformly spaced along the length of the overhead cable tray 36. Thus, in one embodiment, for a cable assembly 38 having multiple terminals 42, each of the terminals 42 is uniformly spaced along the fiber optic cable 40 and correspond to uniformly spaced racks 32. In an alternative embodiment (not shown), however, the terminals 42 may be non-uniformly spaced along the length of the fiber optic cable 40 and correspond to non-uniformly spaced racks 32.

Figure 6:
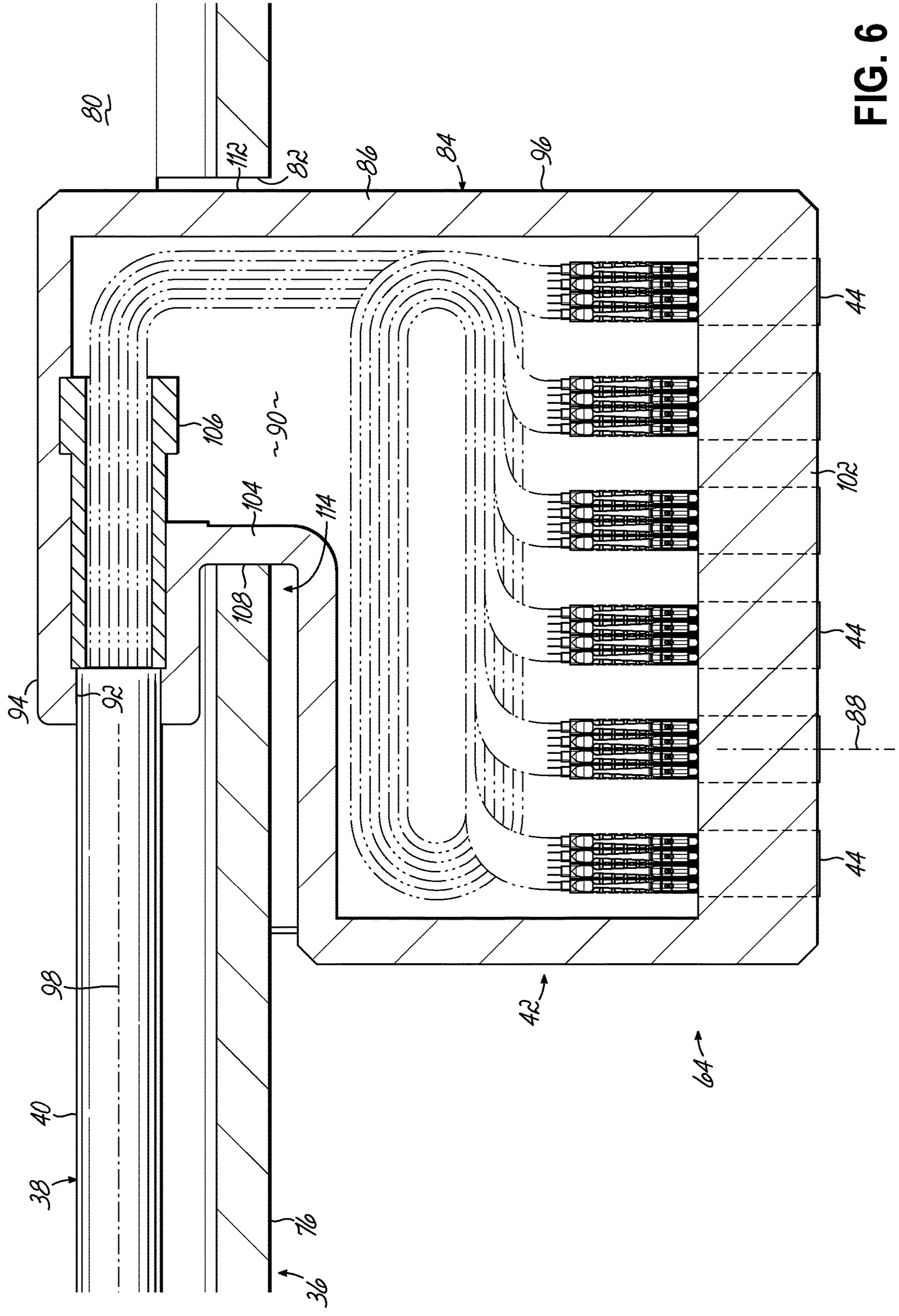
FIG. 6 is a cross-sectional plan view of a fiber optic cable assembly having a fiber optic cable and a terminal in accordance with embodiments of the disclosure.

With reference now to FIGS. 4 and 6, the cable tray 36 extends from the patch panel 34 above and generally parallel with each row 28 (see, for example, FIGS. 2 and 3). In general, the cable tray 36 includes a pair of sidewalls 76 extending upwardly from a bottom wall 80 and receives cabling, such as fiber optic cable 40, for coupling the patch panel 34 to the network equipment 18. As an example, one commercially available cable tray utilized in the industry is FiberGuide® Fiber Raceways from Commscope, Hickory, North Carolina. The cable tray 36 may include openings 82 in one or both sidewalls 76. The openings 82 may be cut into the sidewall 76 during installation of the cable tray 36 or they may be formed in the sidewall 76 during manufacturing of the cable tray 36. As examples of other openings 82, various downspouts and waterfall type as-formed tray components/joints are available commercially. Thus, the disclosure is not limited to the openings 82 shown in the figures.

With continued reference to FIGS. 4 and 6, in one embodiment, the terminal 42 is coupled to the cable tray 36. As shown, only a portion of the terminal 42 extends into the cable tray 36 through the sidewall 76 with a majority of the terminal 42 extending outwardly from the sidewall 76. By way of example only, at least 75% of the housing 84 extends outwardly from the sidewall 76. Thus, the space utilized by the terminal 42 in the cable tray 36 is minimized. In that regard, the terminal 42 includes a housing 84 having wall portions 86 that enclose a storage space 90 and define an inlet 92 and the connection ports 44. In the exemplary embodiment shown, the housing 84 orients the inlet 92 and the connection ports 44 general orthogonally relative to one another. Stated another way, and as an example, the housing 84 receives the fiber optic cable 40 at the inlet 92 in a direction generally defined by the cable tray 36, and the housing 84 provides the array of connection ports 44 oriented perpendicularly to the direction of the fiber optic cable 40 in the cable tray 36. Stated in yet another way with reference only to the housing 84, an axis 98 of the inlet 92 is perpendicular to an axis 88 of the connection ports 44. In the embodiment shown, the two axes 88 and 98 reside in a plane of the array of connection ports 44. The connection ports 44 are then more easily assessable during installation and maintenance of the racks 32, such as for plugging in and unplugging of the connectors 46. This configuration facilitates desirable plug-and-play installation of the data center 10.

More particularly, with reference to FIG. 6, in the exemplary embodiment, the housing 84 has a generally C-shaped configuration in which the inlet 92 is defined in an inlet portion 94. The storage space 90 is defined by a main body portion 96 of the housing 84 with the connection ports 44 formed in an array along a wall portion 102. The inlet portion 94 encloses less volume than the main body portion 96. In other words, the inlet portion 94 occupies less space than the main body portion 96 and utilizes less space in the cable tray 36. Between the main body portion 96 and the inlet portion 94 there is a narrow region or neck portion 104. The neck portion 104 is a reduce lateral dimension of the housing 84 between opposing wall portions (indicated at 108 and 112 in FIG. 6). The short wall portion 108 is offset from a centerline of the housing 84 (short wall portion 108 is shown offset from a centerline toward the right side of the housing 84 in FIG. 6). Due to the offset, the housing 84 has an asymmetric shape in a plan view. A dimension of the wall portion 108 is sufficient to extend the housing 84 through the sidewall 76, whereas the opposing wall portion 112 defines an overall dimension of the housing 84. The relative dimensional difference and locations of the wall portions 86, such as wall portions 108 and 112, contribute to the C-shape configuration of the housing 84 and define a gap 114 between the inlet portion 94 and the main body portion 96 proximate the neck portion 104. The gap 114 is dimensioned to receive the sidewall 76. In the exemplary embodiment, when the terminal 42 is installed, the housing 84 is received in the opening 82 so that the sidewall 76 fits in the gap 114.

With continued reference to FIG. 6, the inlet portion 94 may be designed to constrain the fiber optic cable 40 via an epoxy plug 106 with anti-rotation features proximate the inlet 92. The plug 106 enables the fiber optic cable 40 to withstand tensile and rotational forces, such as those that may occur during installation and use. The neck portion 104 extends through opening 82 in the sidewall 76 of the cable tray 36 only to a distance sufficient to minimize extension of the inlet portion 94 into the cable tray 36. For example, the neck portion 104 may position the fiber optic cable 40 to be flush with the inside surface of the sidewall 76. As such, the inlet portion 94 is the only portion of the housing 84 that occupies space in the cable tray 36. This configuration minimizes a footprint of the terminal 42 in the cable tray 36 and eliminates strain on the fiber optic cable 40 at the inlet 92. Between the inlet portion 94 and the main body portion 96, and in the neck portion 104, the fiber optic cable 40, and more particularly the subunits 52, are reoriented from the direction of the fiber optic cable 40 received at the inlet 92 toward an orientation of the connection ports 44. As an example, the fiber optic cable 40 may be reoriented by about 90° From the inlet 92 to the main body portion 96. In the storage space 90 of the main body portion 96, the fiber optic cable 40 may be coiled, as shown, prior to being optically coupled to the connection ports 44. By way of example only, the storage space 90 may contain a meter or more of the fiber optic cable 40. By way of example only, and not limitation, six connection ports 44 are shown. However, the number of connection ports 44 is not limited to six as the number may depend on network equipment 18 in the racks 32 with more or fewer connection ports 44 for more or less equipment 18, respectively. The number of connection ports 44 may also and on the capacity of the connectors 46.

As shown in FIGS. 3 and 6, when the fiber optic cable assembly 38 is installed in the cable tray 36, the inlet portion 94 resides in the space defined by the cable tray 36. The inlet 92 faces in the direction of the end-of-row patch panel 34 (FIG. 3). As such, the fiber optic cable 40 can be installed in the cable tray 36 without bending the fiber optic cable 40 in close proximity to the terminal 42. Multiple individual fiber optic cables 40 may lie on the bottom wall 80 of the cable tray 36. Each fiber optic cable 40 may extend generally from their respective terminals 42 along a straight path to the patch panel 34. As shown in the exemplary embodiment, the connection ports 44 are positioned outside of the cable tray 36 by a distance that is approximately equal to the main body portion 96 of the terminal 42. The connection ports 44 are arranged in a plane that divides the housing 84 and is generally parallel to the bottom wall 80 of the cable tray 36. The connection ports 44 are therefore available for connection at an elevated position approximately the height of the cable tray 36 above the racks 32. This is shown in FIG. 3. Further in this regard, and although not shown, the orientation of the wall portion 102 is not limited to facing generally outward from the cable tray 36. As an example, the wall portion 102 may face toward the rack 32 and so be oriented at an angle. In this configuration, the plane of the connection ports 44 does not divide the housing 84 and forms a non-perpendicular angle with the plane of the bottom wall 80. The connection ports 44 may face toward the rack 32.

Figure 7:
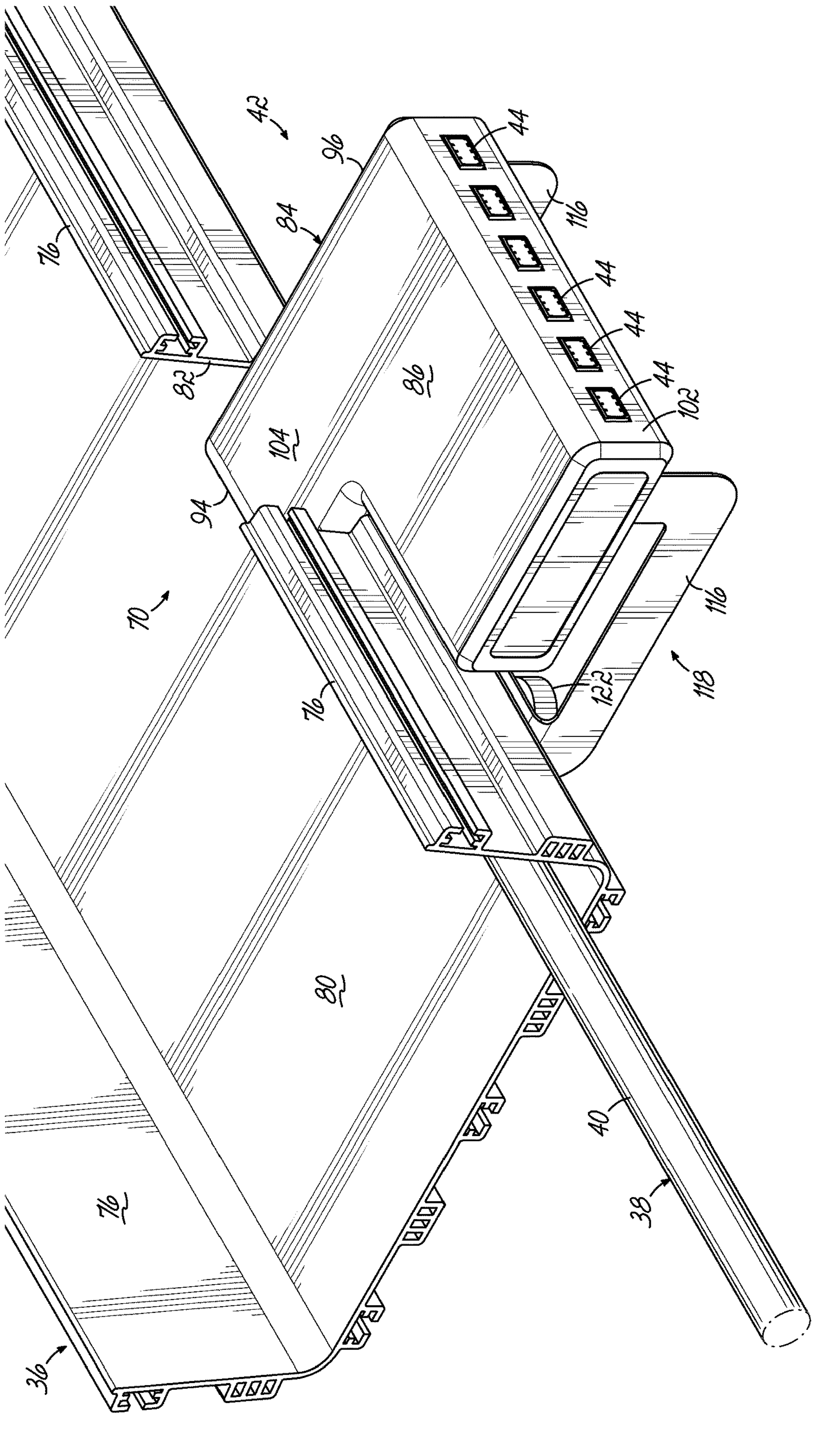
FIG. 7 is a top perspective view of the terminal of FIG. 6 shown coupled to an overhead cable tray in accordance with embodiments of the disclosure.
Figure 8:
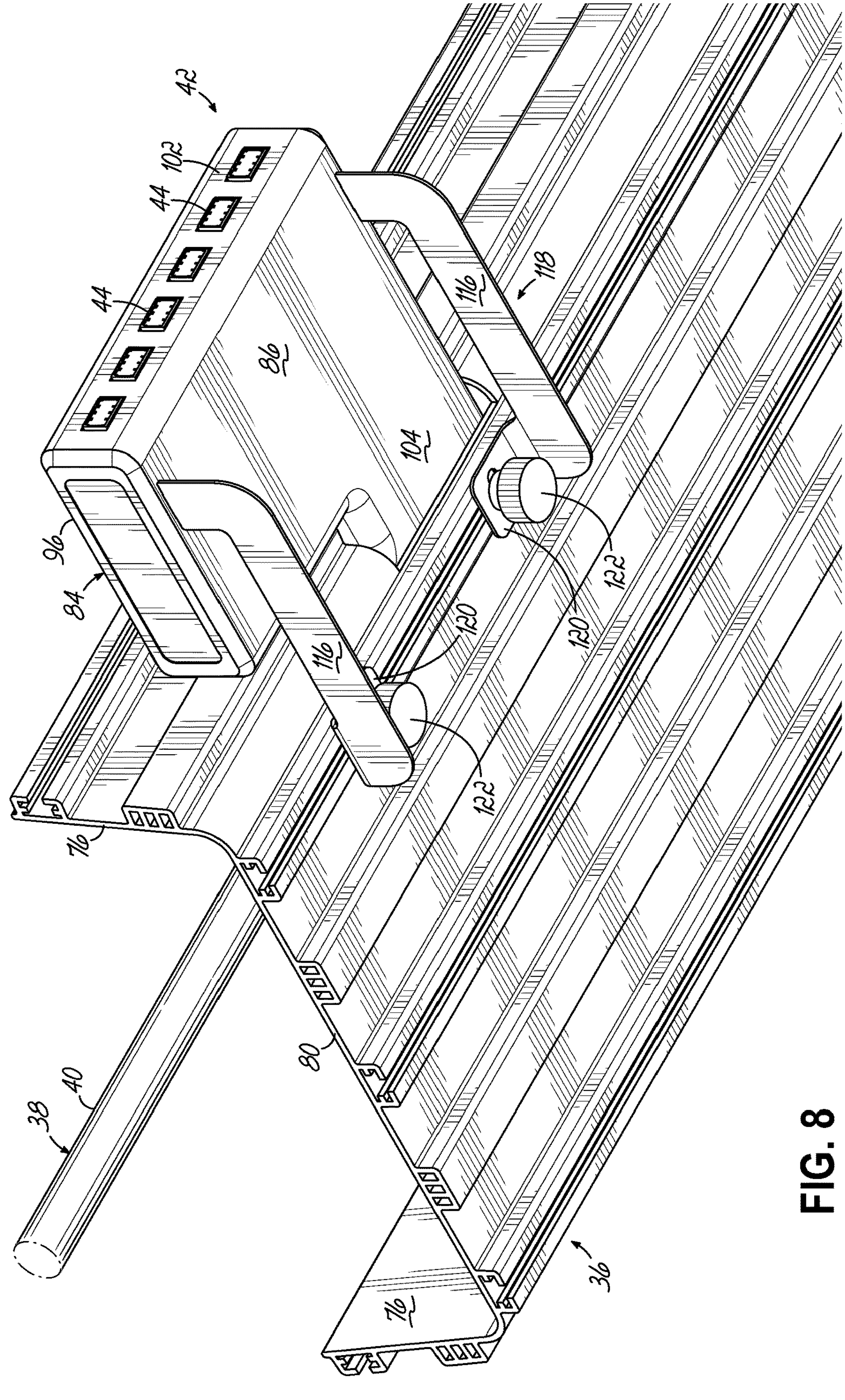
FIG. 8 is a bottom perspective view of the terminal shown in FIG. 7.

With reference now to FIGS. 7 and 8, in one embodiment, the terminal 42 includes a hanger system 118 for securing the fiber optic cable assembly 38 to the cable tray 36. In one embodiment, the hanger system 118 includes a pair of brackets 116 extending from the housing 84 for supporting the terminal 42 at an elevated position of the cable tray 36. Each of the brackets 116 includes one end coupled to the housing 84 and an attachment end having a flange 120. Each flange 120 receives a fastener 122 for attaching the bracket 116 to the cable tray 36. As shown, the brackets 116 have a generally L-shaped configuration and extend from a bottom wall portion of the housing 84 to position underneath the cable tray 36. The fasteners 122 then couple the flanges 120 to the bottom of the cable tray 36. The brackets 116 in cooperation with the gap 114 are sufficient to support the weight of the terminal 42 and connectors 46 when they are plugged into the connection ports 44 in the wall portion 102.

Figure 9:
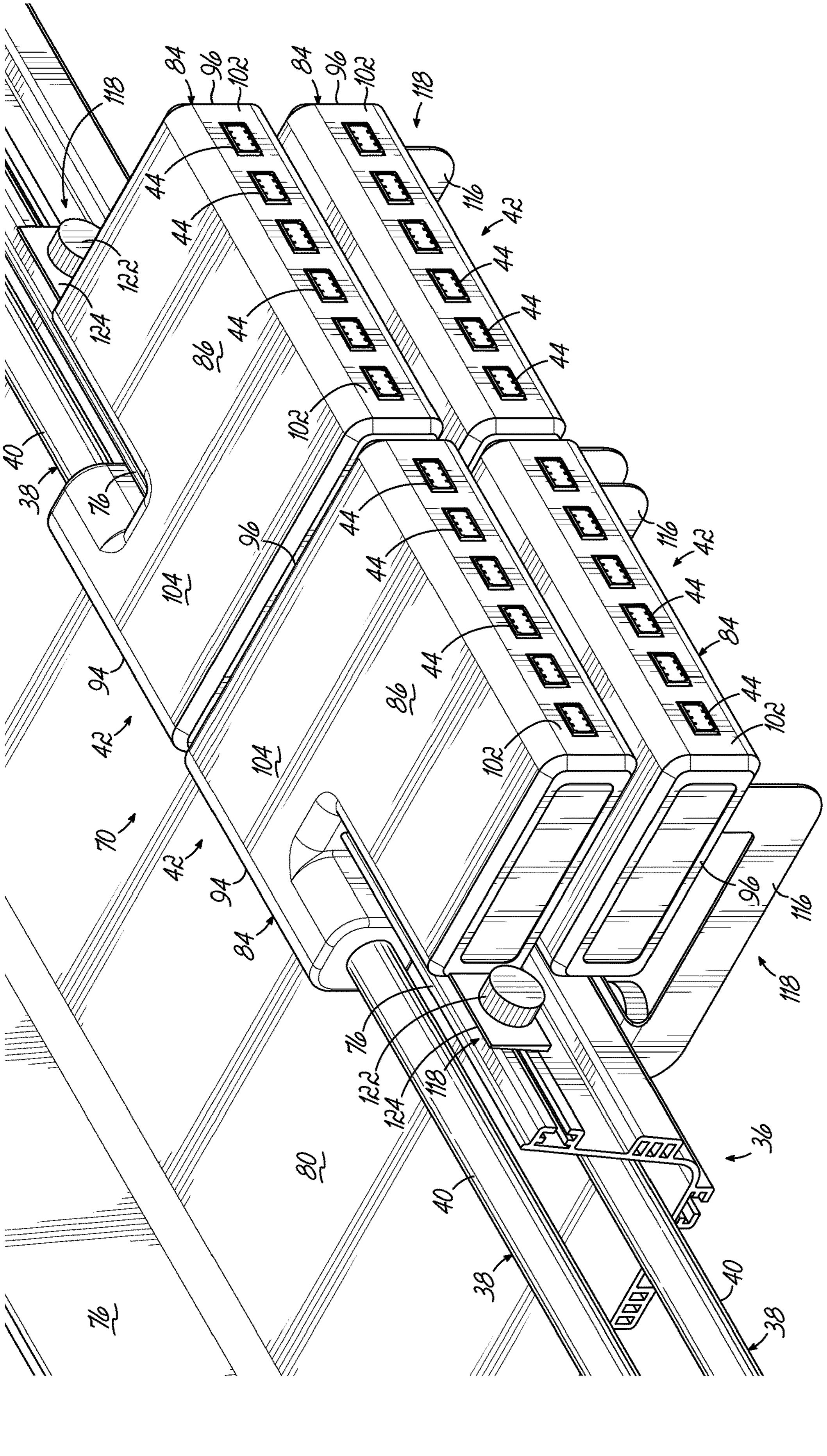
FIG. 9 is a perspective view of multiple stacked terminals shown in a single opening in an overhead cable tray in accordance with embodiments of the disclosure.

In addition, or as an alternative to the brackets 116, and with reference to FIG. 9, in one embodiment, the hanger system 118 includes a tab 124 that extends perpendicularly to the housing 84 and is configured to receive a fastener 122 to secure the terminal 42 to the sidewall 76 of the cable tray 36. The tab 124 in cooperation with the gap 114 are sufficient to support the weight of the terminal 42 and connectors 46 when they are plugged into the connection ports 44 in the wall portion 102. In yet another example, and with reference to FIG. 10, in addition or as an alternative to the tab 124, the hanger system 118 may include a bracket 126 that is similar in some respects to the bracket 116 shown in FIGS. 7 and 8. Although not shown, the bracket 126 couples the terminal 42 to the bottom of the cable tray 36, such as with fasteners 122.

The bracket 126 includes a cable relief frame 130 that extends outwardly of the wall portion 102 of the housing 84. When the connectors 46 are received in the connection ports 44, the cables may be removably secured to the cable relief frame 130. In particular, the cable relief frame 130 includes a downwardly extending bar 132 having a pair of cutouts 134 near its lowest end. Technicians may temporarily secure cables in the cutouts 134 via a Velcro strap or similar to avoid the weight of the rack cable assembly 50 being transferred to the terminal 42 at the individual connection ports 44.

With reference to FIG. 3, multiple individual ones of the cable assemblies 38 are shown installed at locations 70 in the cable tray 36 for connection to respective individual ones of the racks 32. Embodiments of the invention are not limited to the configuration shown in FIG. 3. Multiple cable assemblies 38 may service a single rack 32. For example, with reference to FIG. 9, multiple cable assemblies 38 may be installed at a single location 70. In FIG. 9, four fiber optic cable assemblies 38 are shown installed at a single opening 82 in the sidewall 76 of the cable tray 36. To that end, four terminals 42 are shown stacked one on another one in two separate stacks resulting in a two-by-two stack of terminals 42 in a single opening 82. In the exemplary embodiment shown in FIG. 9, a total of 24 connection ports 44 are shown. By way of example only, and not limitation, where each connection port 44 provides 24 of the fibers 54 for optical connection, the two-by-two stack provides a total of 576 of the fibers 54 that may be utilized by the rack 32 associated with the location 70. Embodiments of the invention are not limited to 576 fibers at a single location as more or fewer fibers may be made available at the terminals 42 and may depend on the particular data center.

Figure 11A:
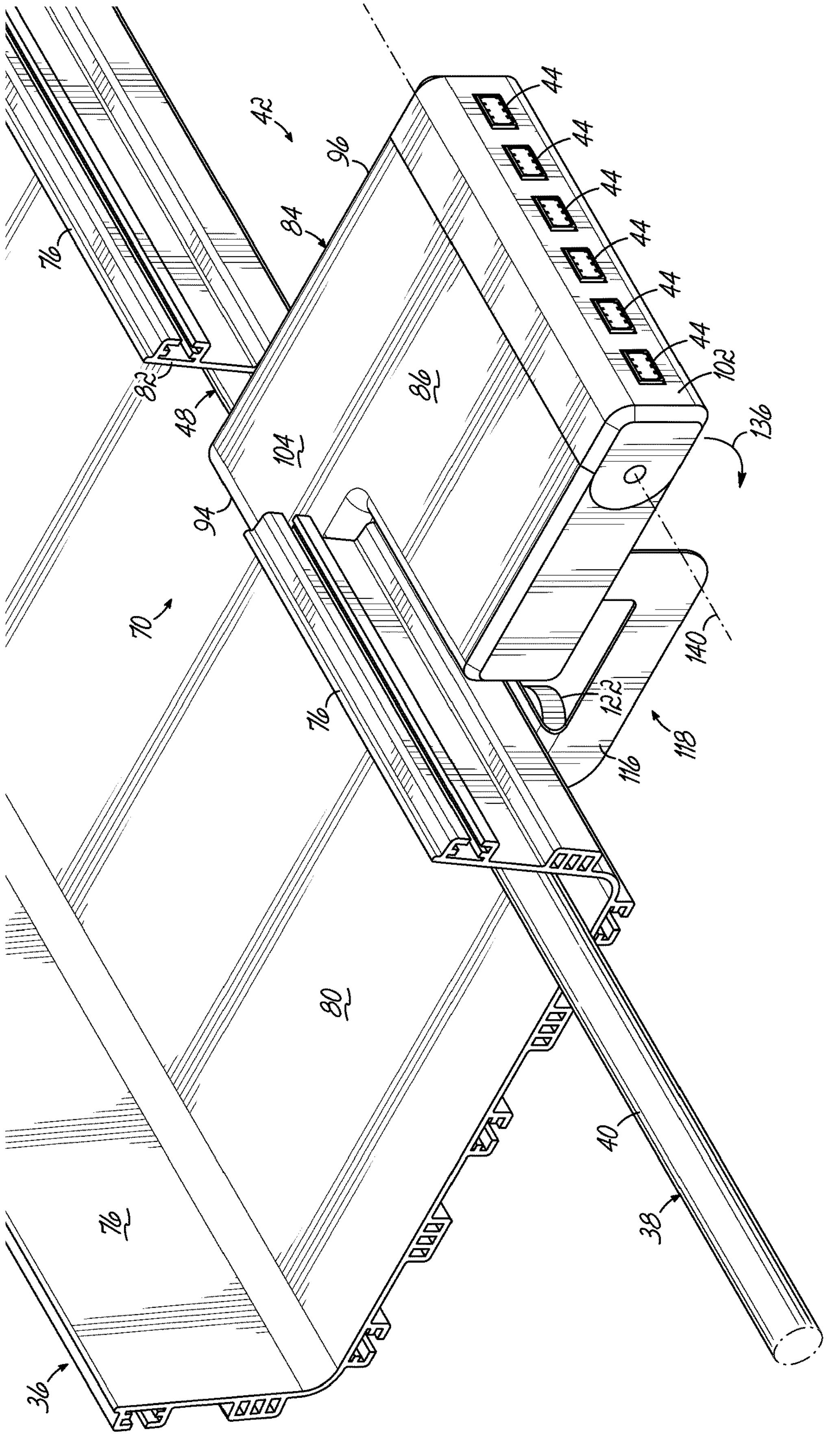
FIGS. 11A and 11B are a perspective view of a terminal shown coupled to the overhead cable tray in accordance with embodiments of the disclosure.
Figure 11B:
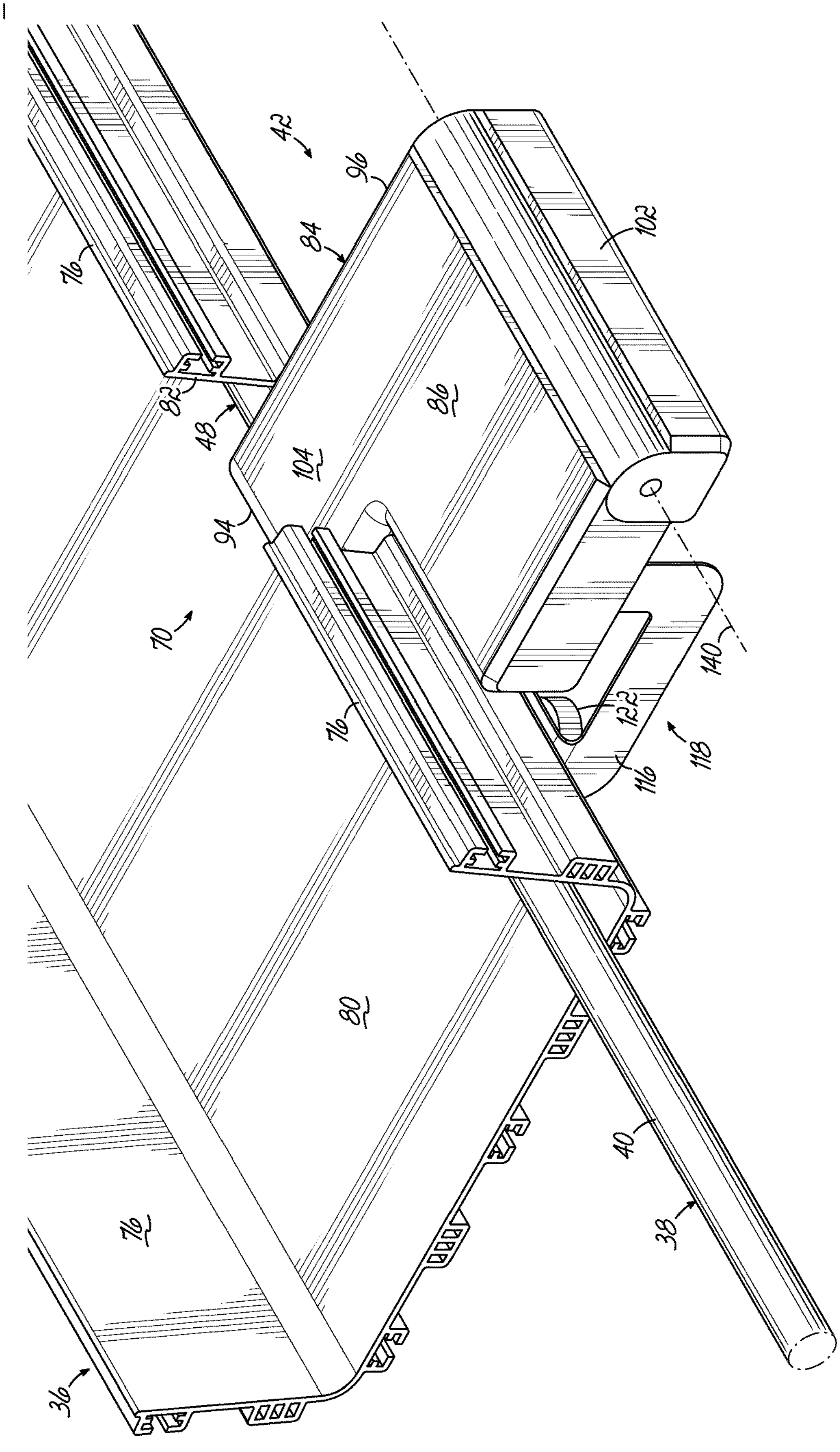

Referring now to FIGS. 11A and 11B, in one embodiment, the housing 84 includes a movable wall portion 102. This is shown by comparison of FIG. 11A to FIG. 11B with reference to arrow 136. The wall portion 102 is movable about an axis 140 to a downward position shown in FIG. 11B. In this orientation, the wall portion 102 is movable to face the racks 32. This may ease installation by permitting rotation of the connection ports 44 to a position in which the connection ports 44 receive connectors 46 from the direction toward the racks 32.

Figure 12A:
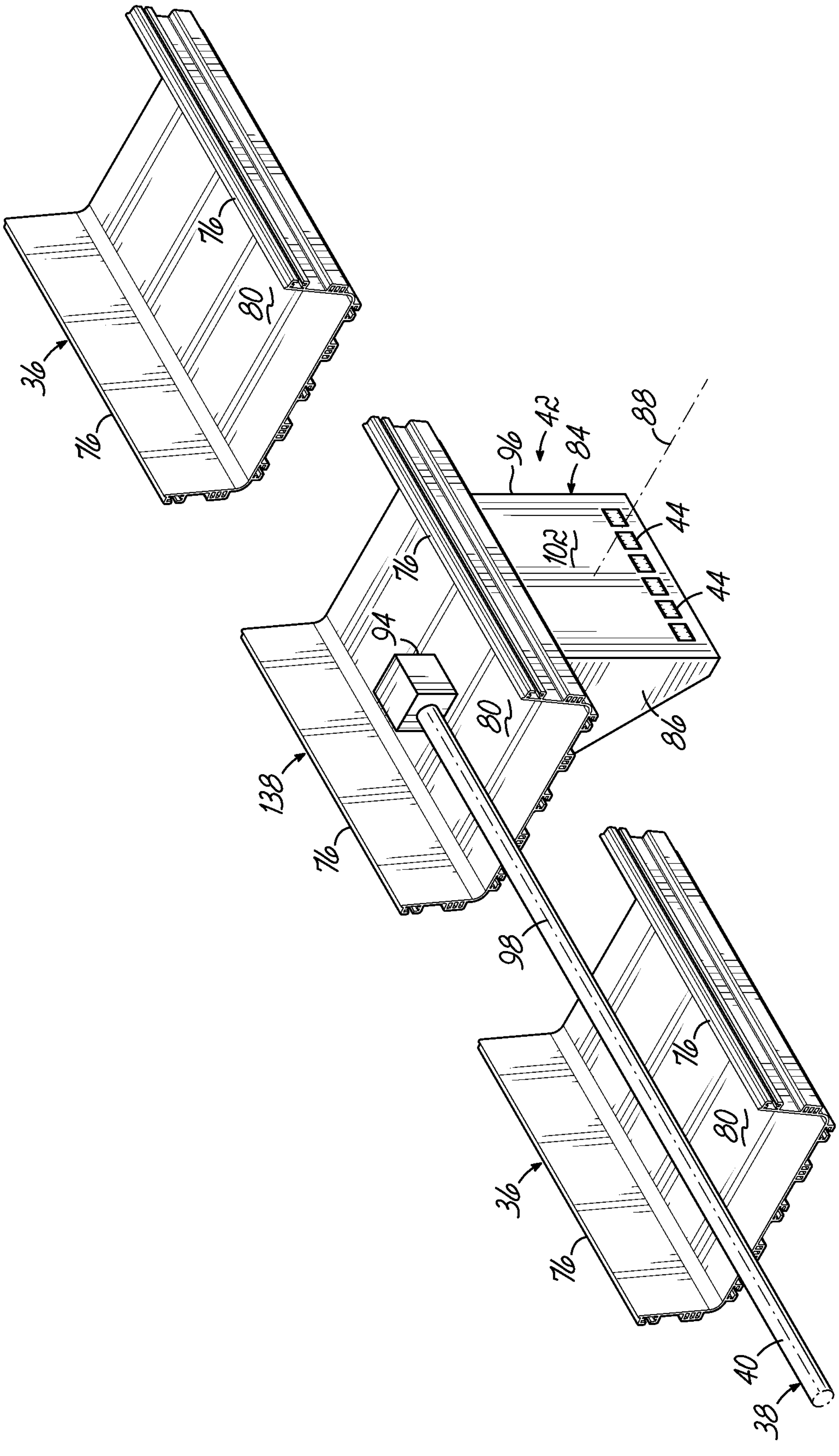
FIGS. 12A, 12B, and 12C are a perspective schematic view of terminals coupled to the overhead cable tray in accordance with embodiments of the disclosure.
Figure 12B:
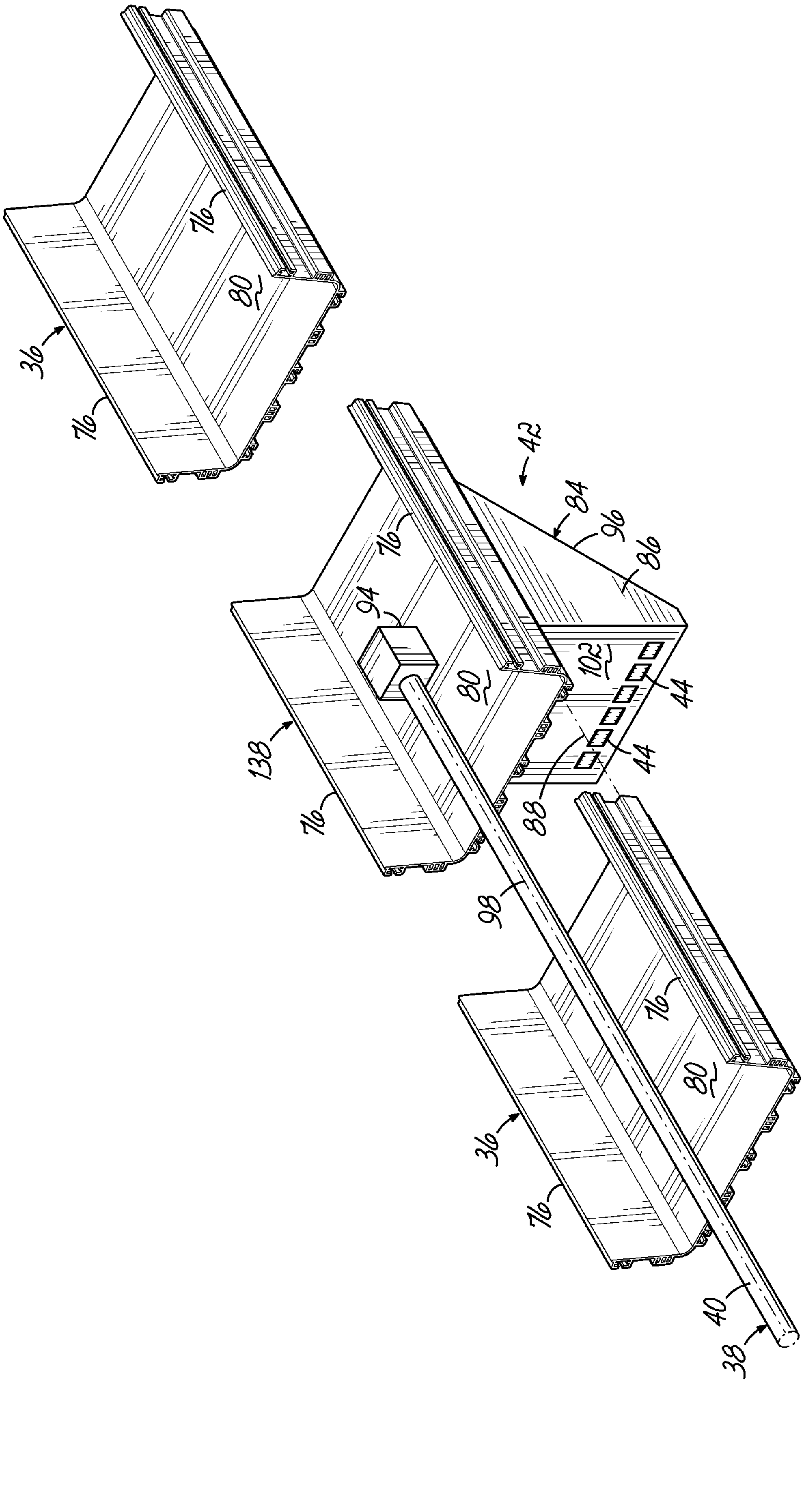
Figure 12C:
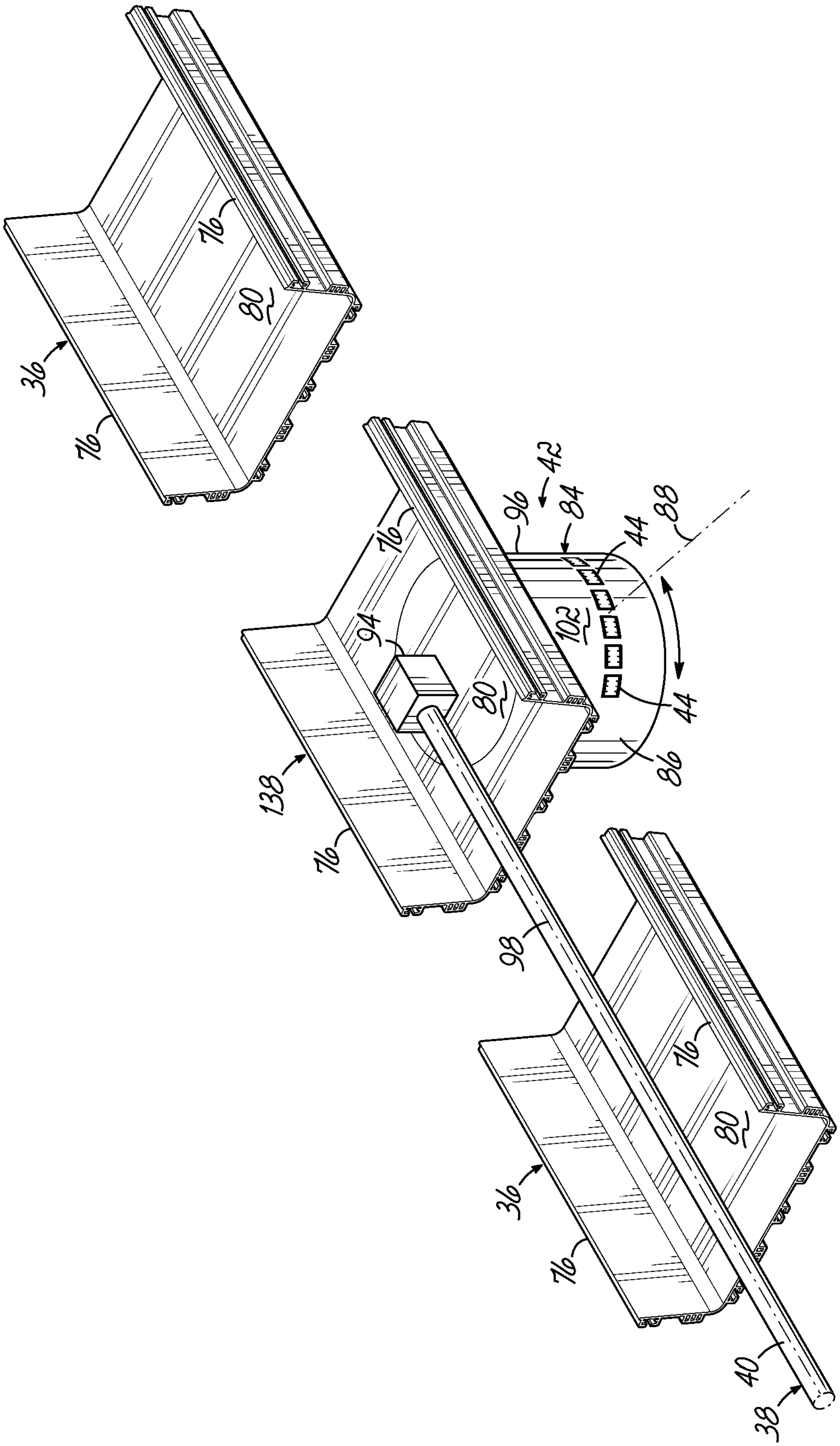

With reference to FIGS. 12A, 12B, and 12C, embodiments of the disclosure are not limited to the connection ports 44 being at the level of the cable tray 36 or in the same plane as the inlet 92. As an example, in FIG. 12A, the terminal 42 is coupled to the bottom wall 80 of the cable tray 36. The inlet portion 94 projects into the cable tray 36 through the bottom wall 80. The main body portion 96 has a prism-like configuration with the wall portion 102 facing outwardly to provide the array of the connection ports 44 in a plane below the bottom wall 80 of the cable tray 36. A similar configuration is shown in FIG. 12B in which the connection ports 44 are located in a plane below the bottom wall 80 of the cable tray 36 though the wall portion 102 faces in the direction of the patch panel 34. In this embodiment, axes 88 of the connection ports 44 are parallel with an axis 98 of the inlet 92. With reference to FIG. 12C, the main body portion 96 of the housing 84 has a right circular cylindrical configuration which may have limited rotation capability as indicated by the arrows. Again, the connection ports 44 are located in a plane below the bottom wall 80 of the cable tray 36.

In FIGS. 12A, 12B, and 12C, embodiments of the fiber optic cable assembly 38 may include an interlink 138 which matches the configuration of the cable tray 36. During installation, the interlink 138 may be inserted in between sections of the cable tray 36.

Figure 13A:
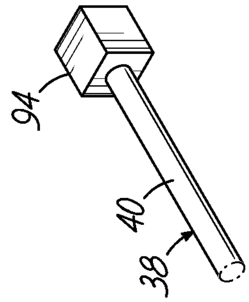
FIGS. 13A, 13B, and 13C are a perspective schematic view of inlet portions of terminals in the overhead cable tray in accordance with embodiments of the disclosure.
Figure 13B:
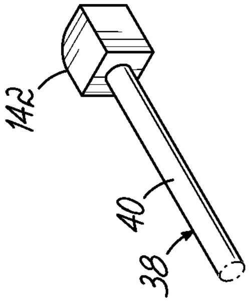
Figure 13C:
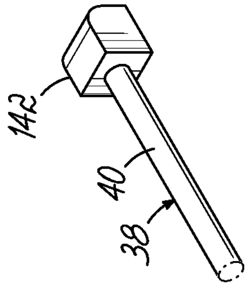

With reference now to FIGS. 13A, 13B, and 13C, and one embodiment, the configuration of the inlet portion 94 may include a surface 142 that is angled with respect to a long axis of the cable tray 36. As exampled, the surface 142 may be rounded (FIG. 13B) or beveled (FIG. 13C) and may be oriented to ease pulling of additional cables 40 through the cable tray 36 by reducing snagging of the additional fiber optic cables 40 on terminals 42 installed upstream. The surface 142 may be applied to each embodiment of the housing 84 disclosed here.

While the present disclosure has been illustrated by the description of specific embodiments thereof, and while the embodiments have been described in considerable detail, it is not intended to restrict or in any way limit the scope of the appended claims to such detail. The various features discussed herein may be used alone or in any combination within and between the various embodiments. Additional advantages and modifications will readily appear to those skilled in the art. The disclosure in its broader aspects is therefore not limited to the specific details, representative apparatus and methods and illustrative examples shown and described. Accordingly, departures may be made from such details without departing from the scope of the disclosure.

What is claimed is:

1. A system, comprising:
- a cable tray having a sidewall and a bottom wall that defines an interior and exterior of the cable tray, the sidewall including at least one opening;
- at least one fiber optic cable assembly, each of the at least one fiber optic cable assembly comprising:
  - a fiber optic cable including a plurality of subunit cables, at least one of the plurality of subunit cables including at least one optical fiber; and
  - at least one terminal along a length of the fiber optic cable, wherein the at least one terminal comprises:
    - a housing including a plurality of wall portions, the plurality of wall portions defining an inlet portion and a main body portion, the inlet portion including an inlet through which the fiber optic cable enters the housing, and the main body portion including a plurality of connection ports, at least one of the plurality of connection ports being optically coupled to at least one optical fiber,
- wherein each of the at least one fiber optic cable assembly is positioned such that the fiber optic cable is in the interior of the cable tray and the housing extends through a respective one of the at least one opening in the sidewall such that the inlet portion is in the interior of the cable tray and the main body portion is in the exterior of the cable tray.

2. The system of claim 1, wherein the inlet portion encloses a volume and the main body portion encloses a volume greater than the volume of the inlet portion.

3. The system of claim 1, wherein the housing includes a neck portion between the inlet portion and the main body portion and the neck portion defines a gap between the inlet portion and the main body portion.

4. The system of claim 3, wherein the housing is asymmetric.

5. The system of claim 3, wherein the neck portion is offset from a centerline of the main body portion of the housing.

6. The system of claim 1, wherein the inlet defines an axis and each of the plurality of connection ports defines an axis, and the axis of the inlet is perpendicular to at least one axis of one of the plurality of the connection ports.

7. The system of claim 6, wherein the axis of the inlet and the at least one axis of one of the plurality of the connection ports are in the same plane.

8. The system of claim 6, wherein the axis of the inlet and the at least one axis of one of the plurality of the connection port are in different planes.

9. The system of claim 1 wherein the inlet includes an axis and each of the plurality of connection ports includes an axis, and the axis of the inlet is parallel to at least one axis of one of the plurality of the connection ports.

10. The system of claim 9, wherein the axis of the inlet and the at least one axis of one of the plurality of the connection port are in different planes.

11. The system of claim 1, wherein the main body portion includes a storage space and a portion of the at least one subunit cable is coiled in the storage space adjacent the connection ports.

12. The system of claim 1, wherein the least one terminal forms a terminal end of the fiber optic cable assembly.

13. The system of claim 1, wherein the at least one terminal includes a first terminal and a second terminal and at least one subunit of the fiber optic cable passes through the first terminal and enters the second terminal.

14. The system of claim 1, wherein the at least one terminal includes a hanger system for coupling the terminal to a cable tray.

15. The system of claim 14, wherein the hanger system includes a bracket configured to couple the housing to a bottom wall of the cable tray.

16. The system of claim 14, wherein the hanger system is configured to be secured to the cable tray with the plurality of connection ports being positioned at an elevation of the cable tray.

17. The system of claim 1, wherein the at least one fiber optic cable assembly comprises:

a first fiber optic cable assembly; and a second fiber optic cable assembly, wherein the fiber optic cable of the first fiber optic cable assembly has a first length from a first one or more connectors to a first terminal of the at least one terminal, wherein the fiber optic cable of the second fiber optic cable assembly has a second length from a second one or more connectors to a second terminal of the at least one terminal, and wherein the first length is different from the second length.

18. The system of claim 17, wherein the first terminal forms a terminal end of the first fiber optic cable assembly, and the second terminal forms a terminal end of the second fiber optic cable assembly.

19. A fiber optic cable assembly, comprising:

a fiber optic cable including a plurality of subunit cables, at least one of the plurality of subunit cables including at least one optical fiber; and at least one terminal along a length of the fiber optic cable, wherein the at least one terminal comprises:

a housing including a plurality of wall portions, the plurality of wall portions defining an inlet portion and a main body portion, the inlet portion including an inlet through which the fiber optic cable enters the housing, and the main body portion including a plurality of connection ports, at least one of the plurality of connection ports being optically coupled to at least one optical fiber, wherein the plurality of connection ports is arranged in an array, the array defines a plane that divides the housing, and the plane of the array is parallel to a plane of a bottom wall of a cable tray when the terminal is coupled to the cable tray.

20. A system comprising:

a cable tray having a sidewall and a bottom wall, the sidewall including an opening; and a fiber optic cable assembly comprising:

a fiber optic cable including a plurality of subunit cables, at least one of the plurality of subunit cables including at least one optical fiber; and at least one terminal along a length of the fiber optic cable, wherein the at least one terminal comprises:

a housing including a plurality of wall portions, the plurality of wall portions defining an inlet portion and a main body portion, the inlet portion including an inlet through which the fiber optic cable enters the housing, and the main body portion including a plurality of connection ports, at least one of the plurality of connection ports being optically coupled to at least one optical fiber, wherein the housing further includes a neck portion between the inlet portion and the main body portion and the neck portion defines a gap between the inlet portion and the main body portion, and wherein the sidewall of the cable tray is received in the gap.

21. A fiber optic cable assembly, comprising:

a fiber optic cable including a plurality of subunit cables, at least one of the plurality of subunit cables including at least one optical fiber; and at least one terminal along a length of the fiber optic cable, wherein the at least one terminal comprises:

a housing including a plurality of wall portions, the plurality of wall portions defining an inlet portion and a main body portion, the inlet portion including an inlet through which the fiber optic cable enters the housing, and the main body portion including a plurality of connection ports, at least one of the plurality of connection ports being optically coupled to at least one optical fiber, wherein at least a section of the main body portion that includes the plurality of connection ports is moveable relative to the inlet portion between a first position where the plurality of connection ports have a first orientation and a second position where the plurality of connection ports have a second orientation different from the first orientation.

22. A system, comprising:

a cable tray having a sidewall and a bottom wall; and a fiber optic cable assembly, comprising:

a fiber optic cable including a plurality of subunit cables, at least one of the plurality of subunit cables including at least one optical fiber; and at least one terminal along a length of the fiber optic cable, wherein the at least one terminal comprises:

a housing including a plurality of wall portions, the plurality of wall portions defining an inlet portion and a main body portion, the inlet portion including an inlet through which the fiber optic cable enters the housing, and the main body portion including a plurality of connection ports, at least one of the plurality of connection ports being optically coupled to at least one optical fiber, wherein the housing of the at least one terminal extends from the bottom wall of the cable tray such that the plurality of connection ports is positioned below the cable tray.

23. The system of claim 22, wherein at least a section of the main body portion that includes the plurality of connection ports is moveable relative to the inlet portion between a first position where the plurality of connection ports have a first orientation and a second position where the plurality of connection ports have a second orientation different from the first orientation.

* * * * *